(12) United States Patent
Clapper (10) Patent No.: US 6,823,257 B2
(45) Date of Patent: Nov. 23, 2004

(54) NON-GPS NAVIGATION

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 10/038,027

(22) Filed: Jan. 4, 2002

(65) Prior Publication Data

US 2003/0130787 A1 Jul. 10, 2003

(51) Int. Cl.⁷ .............................................. G01C 21/26
(52) U.S. Cl. .................... 701/207; 701/209; 342/357.1; 455/456.1; 455/456.3; 455/456.6
(58) Field of Search ................................ 701/207, 200, 701/300, 208, 201, 209; 340/988–991; 342/357.1, 357.01–357.08; 455/456.1, 456.3, 456.6

(56) References Cited

U.S. PATENT DOCUMENTS

| | | | |
|---|---|---|---|
| 6,295,502 B1 * | 9/2001 | Hancock et al. ............ 701/201 |
| 6,311,065 B1 * | 10/2001 | Ushiki et al. ............... 455/440 |
| 6,317,684 B1 * | 11/2001 | Roeseler et al. ............ 701/202 |
| 6,327,533 B1 * | 12/2001 | Chou ........................ 701/207 |
| 6,374,177 B1 * | 4/2002 | Lee et al. .................... 701/200 |
| 6,385,454 B1 * | 5/2002 | Bahl et al. .................. 455/450 |
| 6,510,387 B2 * | 1/2003 | Fuchs et al. ................ 701/213 |
| 6,515,595 B1 * | 2/2003 | Obradovich et al. ........ 340/905 |
| 6,529,824 B1 * | 3/2003 | Obradovich et al. ........ 701/208 |
| 6,535,743 B1 * | 3/2003 | Kennedy et al. ......... 455/456.1 |
| 6,584,402 B2 * | 6/2003 | Fukushima et al. ......... 701/202 |
| 6,590,529 B2 * | 7/2003 | Schwoegler ........... 342/357.13 |
| 6,597,983 B2 * | 7/2003 | Hancock .................... 701/200 |
| 6,609,062 B2 * | 8/2003 | Hancock .................... 701/200 |
| 6,701,143 B1 * | 3/2004 | Dukach et al. .......... 455/414.2 |

OTHER PUBLICATIONS http://mobile.yahoo.com/phone/land?.pv=dd&.dev=phone, Get Yahoo! Driving Directions on your mobile phone, pp. 1–2, published at least as early as Oct. 31, 2001.

http://mobile.yahoo.com/phone/land?.pv=ps&.dev=phone, Yahoo! People Search, pp. 1–2, published at least as early as Nov. 13, 2001.

* cited by examiner

Primary Examiner—Richard M. Camby
(74) Attorney, Agent, or Firm—Trop, Pruner & Hu, P.C.

(57) ABSTRACT

Non-GPS based navigation may be implemented by a cellular network service provider. The service provider may have data regarding a cellular radiotelephone's location within its coverage area. Geographic data for the cell phone's location may be obtained from a geographic database. Accordingly, navigational assistance may be provided to the user of the cellular radiotelephone through the interplay between the provider, telephone and geographic database. Additionally, the telephone may have a database storing telephone number-address pairs. Thus, when the user of the telephone inputs a telephone number as destinational information, the address corresponding to that phone number may be the destination location to which the user is traveling.

20 Claims, 9 Drawing Sheets

NON-GPS NAVIGATION

BACKGROUND

This invention relates generally to navigational systems and specifically to navigational systems that utilize wireless communication devices.

Navigational systems, such as the Global Positioning Systems (GPS) are gaining popularity with the public. Generally, GPS works by utilizing a cluster of satellites to determine a receiver's location. For example, each satellite in the cluster broadcasts a signal with identification, time and location information. A receiver receives this information from a plurality of satellites to determine the receiver's position. Accordingly, a user may use positional information for vehicle navigation and/or route tracking. However, there are drawbacks to GPS navigation including the requirement of special equipment. Moreover, GPS is generally directed toward trip planning and not real-time navigation.

Cellular telephones are also very popular with the general public and their use is widespread. In fact, it is quite common to observe several people reaching for their cell phone when a ring is heard.

Cellular telephone providers offer several features for use with their phones. For example, a phone may have caller identification, voice mail, automatic dialing and the like. Moreover, it is becoming more common to be able to access the Internet to check e-mail and the like through a wireless communication device. Thus, cellular telephones and wireless communication devices are becoming an indispensable tool for many users, so indispensable that they are carried with the user wherever the user goes.

Accordingly, there is a need for non-GPS based navigation utilizing readily available cellular radiotelephones and other cellular-based wireless communication devices.

DETAILED DESCRIPTION

Figure 1:
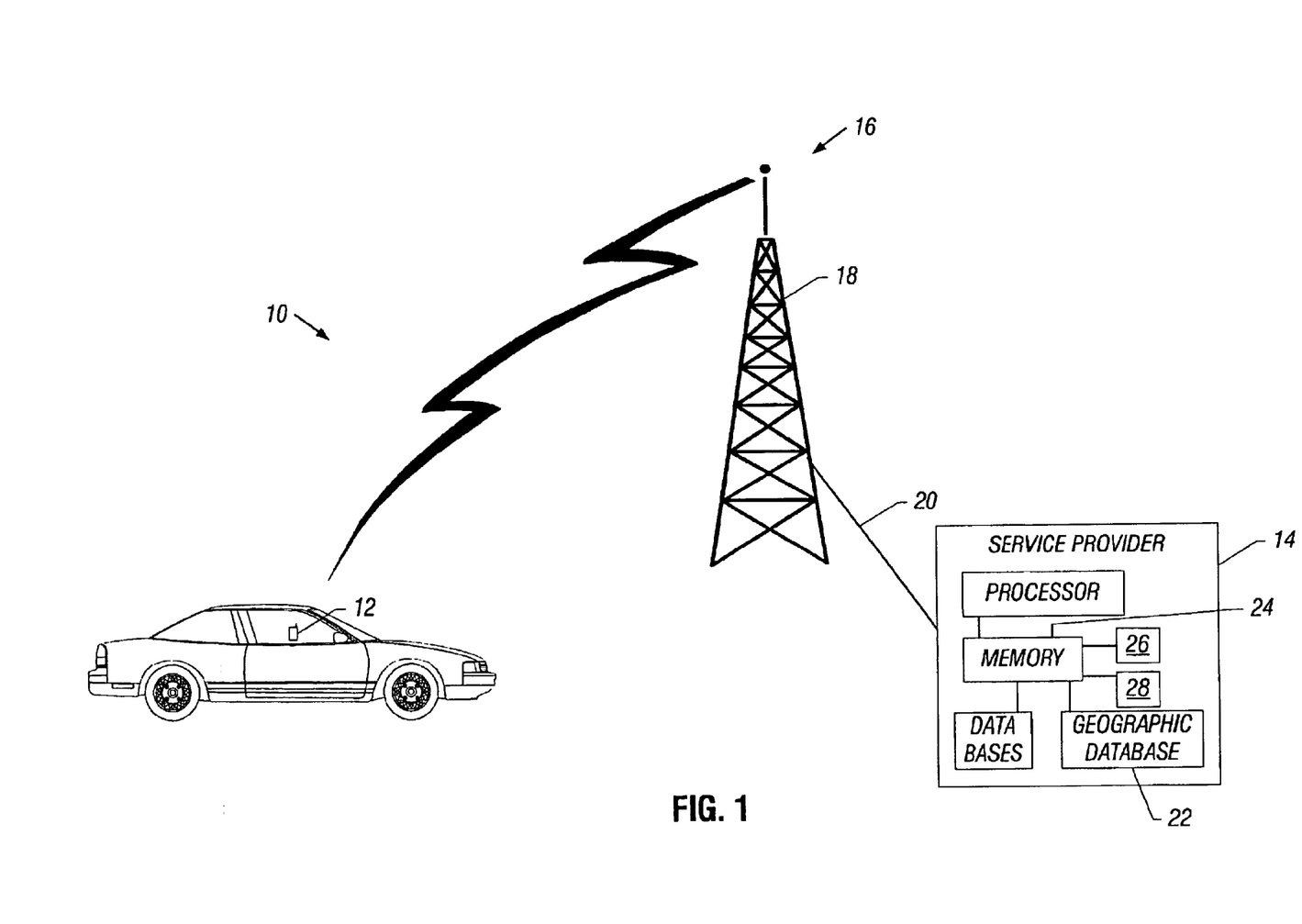
FIG. 1 is a schematic depiction of a navigational system in accordance with one embodiment of the present invention.

Pursuant to one embodiment of the present invention, a non-GPS navigation system 10, as shown in FIG. 1, includes a cellular-based mobile unit 12, a cellular telephone service provider 14 and one or more cell sites 16. The navigational system 10 may be used with any cellular radiotelephone system that is based on frequency reuse, such as Advanced Mobile Phone Service (AMPS); Interim Standard 136 (IS-136), also known as Digital AMPS (D-AMPS); Global System for Mobile Communications (GMS); Interim Standard 95 (IS-95) or Personal Communication System (PCS) as examples.

Frequency reuse refers to the ability of a radiotelephone system to reuse designated radio frequencies within its coverage area. Generally, the system's coverage area is divided into a number of cells. Cells are limited geographical areas that are defined by the coverage provided by a low power radio antenna. Each cell is assigned a set of radio frequencies for transmitting data to and receiving data from the mobile units within the cell's limited coverage area. Thus, a given frequency, assigned to several of the cells, may be reused. However, cells that are assigned the same frequencies are not usually adjacent to each other. In other words, adjacent cells do not transmit and receive on the same radio channels, which allows for frequency reuse while minimizing call interference.

The above explanation of frequency reuse is generally in reference to an analog system utilizing frequency division multiple access (FDMA) as a mode of transmission. However, other cellular protocols such as IS-136 and GSM reuse available frequencies while transmitting information by time division multiple access (TDMA). Moreover, even those protocols utilizing code division multiple access (CDMA) such as IS-95 and PCS are based on the principle of frequency reuse. Thus, the navigational system 10 may be implemented with any cellular system utilizing frequency reuse.

Referring back to FIG. 1, the mobile unit 12 may be any cellular radiotelephone including those that transmit and receive on the 800 mHz band and/or 1900 mHz band. For example, the unit 12 may utilize a protocol such as AMPS that transmits by FDMA. Alternatively, the mobile unit 12 may operate via D-AMPS or GSM transmitting by TDMA or IS-95 or PCS transmitting by CDMA. Further, the mobile unit 12 may utilize any combination of protocols and modes of transmission to provide a primary and default means of radio communication. Because many systems default to analog based communications, the following description is generally based on an analog system. However, the system 10 may utilize any cellular telephone technology. Thus, the following description should not be construed as being limited to an analog system.

The physical location of the low power radio equipment that services a cell is known as a cell site. Cell sites, including cell site 16 of system 10 may include base station radio equipment (not shown) and a tower 18 with one or more antennas. The radio equipment located at the cell site 16 may include a computerized transceiver to facilitate communications between the mobile unit 12 and the service provider 14. Moreover, the tower 18 may be equipped with an antenna that transmits signals in all directions or in one particular direction.

A communications link 20, such as a regular cable communication channel, may also be located at the cell site 16. The link 20 may relay signals between the service provider 14 and the cell site 16. In this way, the mobile unit 12 may be in communication with the service provider 14.

The service provider 14 may or may not be where the mobile telecommunications switching office (MTSO) is located. Typically, the MTSO controls the entire cellular network. For example, the MTSO manages the traffic within each cell and it performs various administrative functions. Some of the MTSO's traffic management functions include measuring the signal quality between a base station and a mobile unit, coordinating handoffs and assigning voice channels. Some administrative functions that the MTSO performs include checking account validity, delivering subscribers services and interacting with the public switched telephone network (PSTN) and several different databases.

Two databases that the MTSO communicates with are the home location register (HLR) and the visitor location register (VLR). The HLR maintains information such as identification numbers, access numbers and the cell location for each mobile unit that is subscribed with the "home" system. The VLR is a database for mobile units that are currently located within a service provider's coverage but are subscribed elsewhere. In other words, the VLR maintains data regarding mobile units that are not subscribed with that provider's home system; hence, the units are visiting within the provider's coverage region. In addition to the HLR and VLR, the service provider 14 implementing navigational system 10 may also include a database 22 for storing geographical information, such as roadways, bodies of water, buildings, parks, and the like. The geographical database 22 may be any commercially available database of the sort. The database 22 may be located at the service provider 14 or it may be remotely located elsewhere, for example at the MTSO.

The information in the HLR and VLR is periodically updated by a process known as registration. Generally, with registration, a mobile unit 12 identifies itself and its location to the system. Registration is automatic and ongoing, and typically occurs whenever a mobile unit is turned on, a phone call is placed, the unit 12 moves from one cell to another and/or after a given period of time such as 10 minutes.

During registration, the MTSO checks the HLR to make sure that the mobile unit's account is valid. If so, the mobile unit 12 is registered in the HLR. When the mobile unit 12 is a visitor to the system, the MTSO of the host carrier contacts that unit's home MTSO to check its HLR for account validity. That HLR verifies its unit's account and the host carrier monitors the visiting unit's calls. Therefore, the home MTSO and HLR know which units are registered within each cell at any given time. TDMA and CDMA based systems have a similar registration process.

Once registered, the mobile unit 12 continually monitors various channels such as paging channels to detect incoming calls. Generally, there are two different ways to page a mobile unit, flood-based paging and registration-based paging. Flood based paging is a process wherein the MTSO sends a page signal to all of the cells in the system so that the mobile unit receives the page no matter what cell it is in. Registration based paging is more direct in that the MTSO uses registration information to send the page to the cell that the phone is registered in.

Once a page is received, the mobile unit 12 confirms and sends a service request to the MTSO. The MTSO assigns an available voice channel and directs the mobile unit 12 and cell site 16 to transmit and receive over that channel.

Generally, with outgoing calls, the mobile unit 12 reregisters and the MTSO assigns a voice channel. If the outgoing call is to the PSTN, the MTSO connects to the PSTN. If the outgoing call is going to another mobile unit, the receiving mobile unit is paged in the manner previously described.

Frequently, a mobile unit will pass from one cell to another during a call. As such, the system will have to change the base station that the unit is communicating with and the voice channel that the user is talking over. This coordinated change is called a handoff. Generally, radio transmission between the mobile unit and base station is handed off to the next base station producing the strongest signal. The MTSO coordinates the handoff so that the mobile unit and new base station are transmitting and receiving on an open channel in the newly entered cell.

Taken together, the general location of each mobile unit 12 within a cellular radiotelephone system may be determined. In other words, a cellular telephone system can determine which cell a particular mobile unit is located in so that communication between the mobile unit and the system can be maintained. Accordingly, navigational system 10 too may be able to establish which cell the mobile unit 12 is located in, in accordance with some embodiments.

The navigational system 10 may be an interactive system in some embodiments. Generally, the system 10 and user interact via exchange through the mobile unit 12. For example, the system interacts with the user by relaying audio, pictorial and/or visual data through the mobile unit 12. In response, the user interacts with the system 10 by relaying voice commands, keypad and/or touch screen entry, menu selection and/or text-to-speech recognition through the mobile unit 12. When the system 10 provides pictoral or visual data it may be in the form of diagrams, charts, graphs, text and/or menus. Moreover, if the system 10 employs text-to-speech and/or text messaging, the mobile unit 12 may be a two-way pager rather than a cellular telephone.

Figure 2:
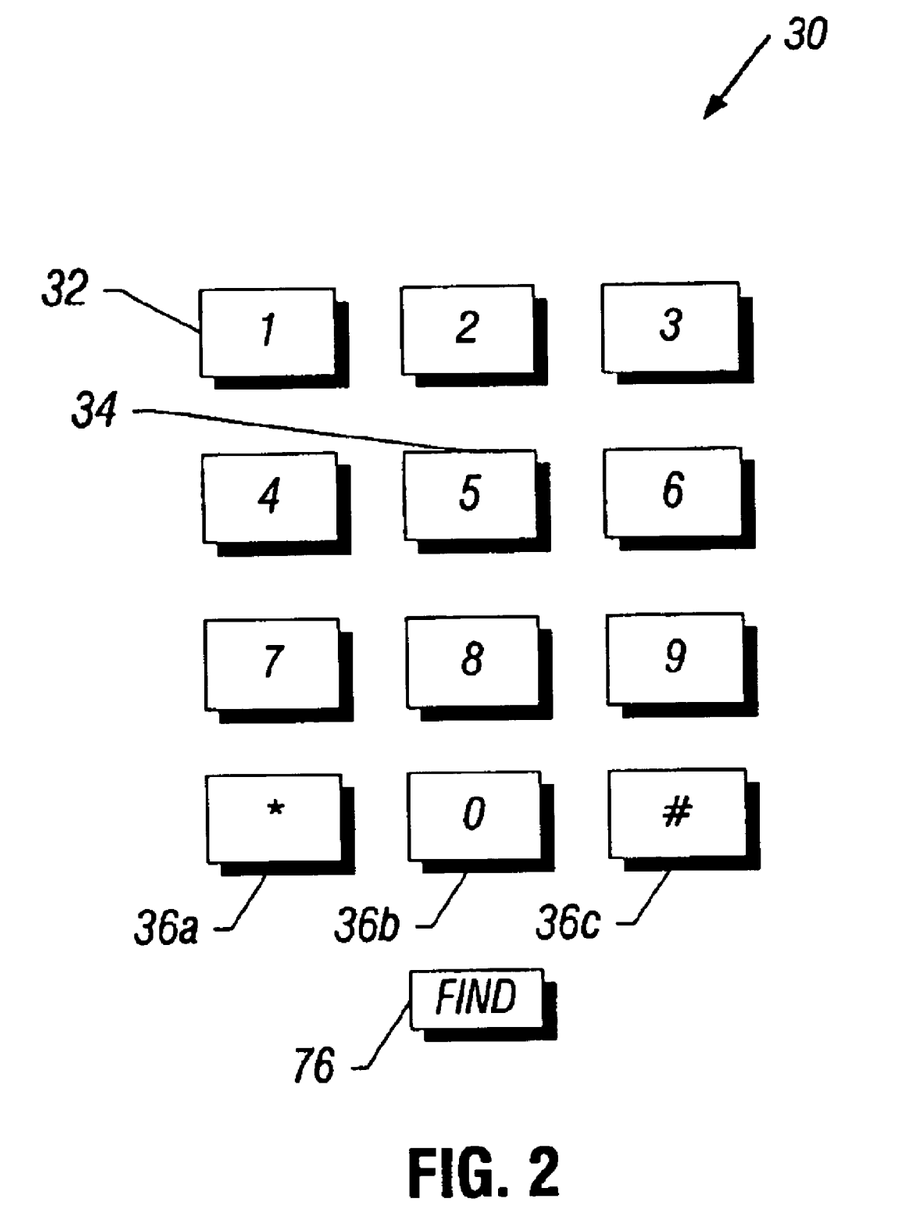
FIG. 2 is a schematic depiction of a keypad for a mobile unit in accordance with one embodiment of the present invention.

The user may use a keypad 30, shown in FIG. 2, to interact with the system 10. In this embodiment, the peripheral numeric keys 32 may be used to enter orientation information. That is, in addition to their conventional use, the peripheral number keys 32 on the keypad 30 may be used to indicate compass direction. For instance, the keys 32 may correspond to 45° increments on a compass wherein the number 2 key 32 indicates due north. As such, the 3, 6, 9, 8, 7, 4 and 1 keys 32 correspond to the directions of northeast, east, southeast, south, southwest, west and northwest, respectively. Thus, when a peripheral number key 32 is depressed, directional information may be relayed to the system 10.

Additionally, according to this embodiment, the central number key 34 and bottom row of keys 36 may have functions other than their conventional functions. For example, the number 5 key 34 may be utilized to navigate a menu displayed on a display screen (not shown) whereas the asterisk 36a, zero 36b and pound 36c keys may be utilized for menu selection or cancellation of an entry or any other function that may be required by the navigational system 10. In one embodiment of the present invention, the key 34 or keys 36 may function as a find key. Alternately, a designated find key 76 may be part of the mobile unit's 12 keypad 30. The find key 34, 36 or 76 may be used in some embodiments to "find" an address corresponding to a telephone number that the user has input as a destination request.

To assist with navigation, the mobile unit's 12 present location may be established. In one embodiment, the navigational system 10 may automatically determine the mobile unit's location. Generally, automatic determination of the unit's present location is based on the unit's physical presence within a cell. That is, based on information gathered by the service provider 14 regarding the mobile unit's presence within a particular cell, the navigational system 10 may automatically establish the mobile unit's current location.

Specifically, physical cell location information, in conjunction with geographical data from the database 22 for the relevant cell or cells, may be used by the system 10 to automatically establish the mobile unit's present location. In one embodiment, the system 10 may log and record the sequential appearance of the mobile unit 12 in cells for a recent period of time such as any length of time within the most recent four hours. Thus, when the mobile unit's current location needs to be established, the system 10 may correlate the mobile unit's cell presence data with geographical data from the database 22 for those cells traversed to infer the unit's geographic location. That is, the system 10 may use the physical cell trend data and geographic information for those cells to derive the user's speed and the gross direction of travel. Further, if the speed and direction correlate to that of a roadway, the system 10 may determine which roadway the user is traveling on. Alternately, if the speed and direction data do not correlate to a roadway, the system 10 may establish another appropriate geographic location for the mobile unit 12. Thus, the system 10 may automatically establish the mobile unit's 12 current location at any given time and may do so at regular intervals such as every minute.

Figure 3:
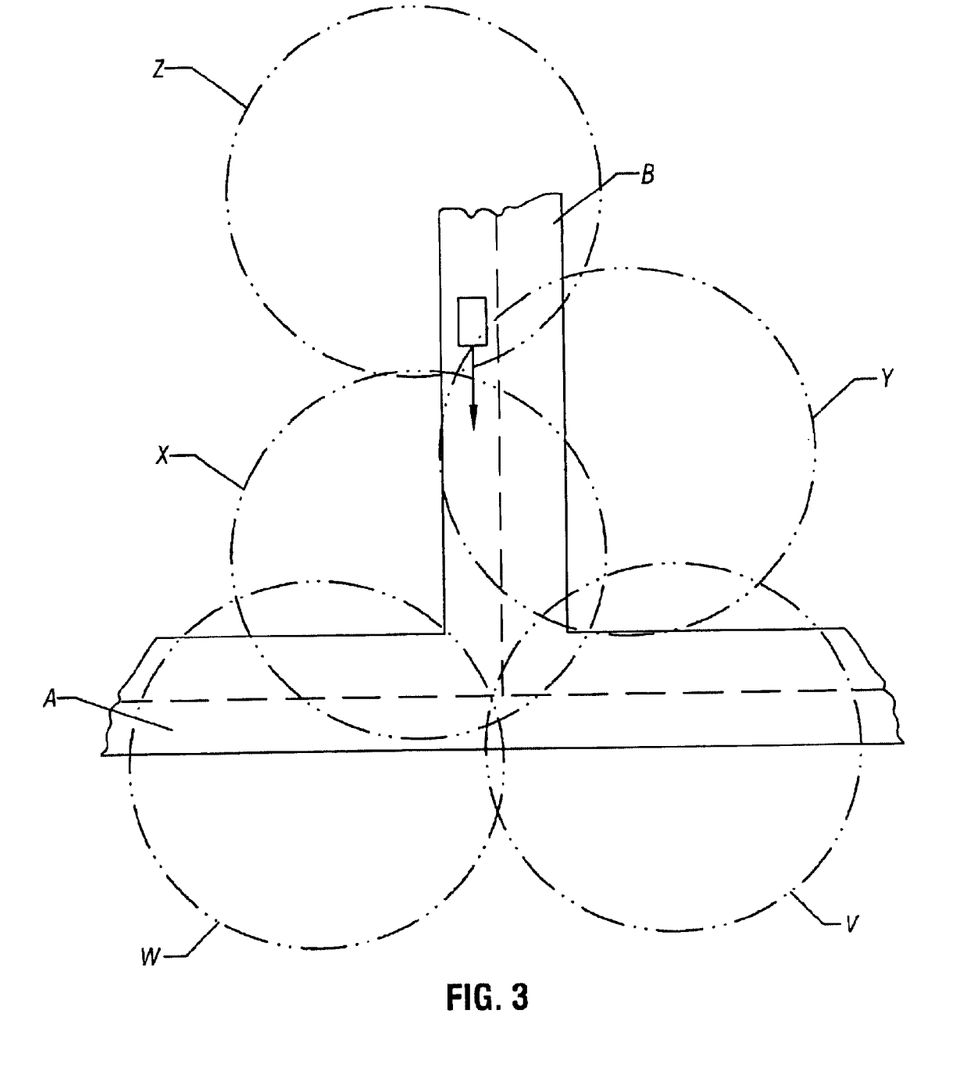
FIG. 3 is a schematic depiction of the navigational system of FIG. 1 where the system is establishing the mobile unit's current location in accordance with some embodiments of the present invention.

According to the example shown in FIG. 3, the system 10 may have logged and recorded prior physical cell activity for the mobile unit 12. As such, the system 10 has established that the mobile unit 12 is presently located in cells Y and Z. Moreover, due to the mobile unit's 12 appearance in cell Z then Y the system 10 may have determined that the mobile unit 12 is moving in a southward direction. Additionally, the system 10 may have determined that the mobile unit 12 passed through cell Z toward cell Y at a speed that is greater than 35 m.p.h. Thus, taking the directional and speed information in conjunction with geographic data for cells Z and Y, the system 10 may have determined that the mobile unit 12 is heading south on roadway B.

The user may input data and/or answer queries to assist the system 10 in establishing the mobile unit's 12 location within a particular cell. In this case, the user may sequentially input data and/or answer queries regarding identifying information such as names of cross streets, buildings, parks, signs and the like. Thus, the system 10 may utilize the information obtained from the user to better establish the unit's 12 location within a cell. Interactive communications between the system 10 and the user may be by any means previously described.

In addition to establishing the mobile unit's current location, the automatic location feature may be employed to help the user determine his/her present location if the user's position is not known. Generally, the user may enter the unit's phone number so that the system 10 can automatically determine the unit's present location as previously described. Moreover, the system 10 may draw on geographic information for the physical cell that the unit 12 is located in to query the user about the surroundings. Answers to the query will assist the system 10 in determining the mobile unit's 12 location within the cell. Similarly, automatic determination of the mobile unit's 12 location may be used to find a lost unit 12. For example, the user may be able to access the log and record data through the Internet to determine the unit's location based on its physical presence within a cell.

To proceed with navigation, destination information may be required by the system 10. In one embodiment, the user may enter a telephone number or name as destination information. The system 10 may utilize this information to determine a corresponding destination location. For example, if the user enters a person's name, the system 10 may determine that the person's home or business address is the desired destination. Alternately, if the user enters a telephone number, the system 10 may determine that the address corresponding to that telephone number is the desired destination. In this embodiment, a telephone number may include a cellular telephone number. If so, the desired destination may be the physical location of the cellular telephone.

In another embodiment, the user may enter specific destination information or request a type of route to reach a destination. For example, the user may want to go to a specific address, park, government building, historical landmark, body of water or the like. In this case, the user enters the desired destination as destination information. In another example, the user may want to travel along a scenic route to a location. Thus, the user enters destination information and request navigation along a scenic route.

Figure 4:
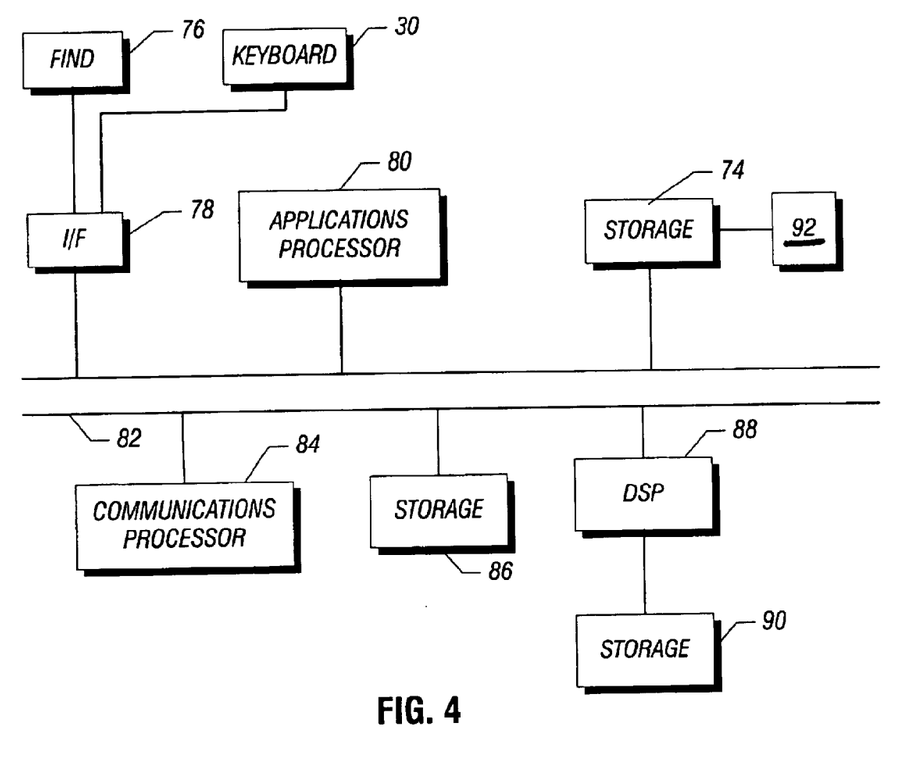
FIG. 4 is a block diagram of a mobile unit in accordance with some embodiments of the present invention.

In the embodiment that the user enters a telephone number as destination information, the mobile unit 12 may be equipped with a storage 74 to store a telephone number-address database, as shown in FIG. 4. Thus, when a user enters a telephone number into the mobile unit 12 by keypad 30 entry, voice command or the like, and depresses the find 76 button, a processor 80 can access the storage 74 to look up the corresponding address.

In this embodiment, the find 76 button is coupled to an interface 78 that is in turn coupled to a bus 82. The bus 82 is also coupled to the applications processor 80, the storage 74 storing software 92, a communications processor 84, a storage 86 and a digital signal processor (DSP) 88. The DSP 88 is in turn coupled to a storage 90.

Figure 5:
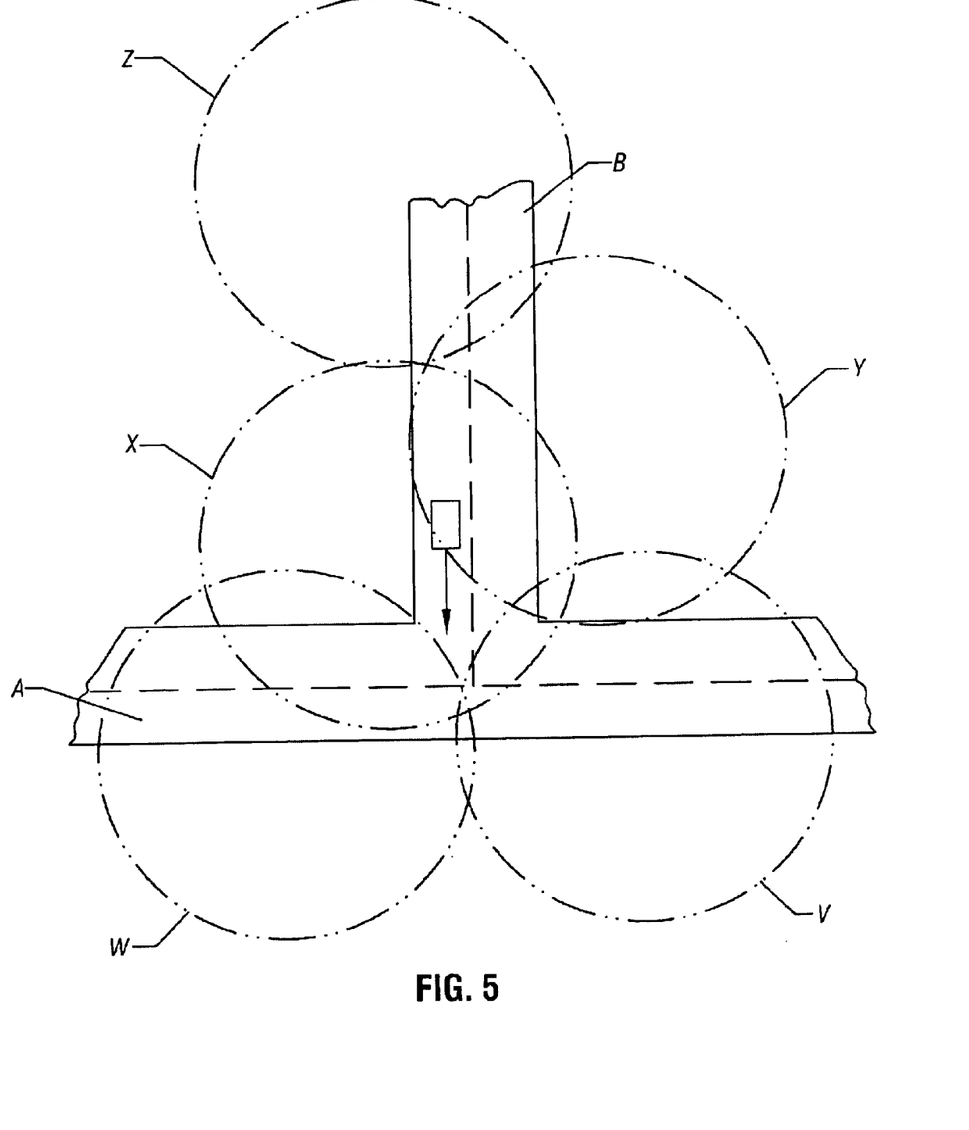
FIG. 5 is a schematic depiction of the navigational system of FIG. 1 where the mobile unit's user is en route in accordance with some embodiments of the present invention.

Once the mobile unit's current location and the location of the preferred destination are known, the system 10 guides the user toward the destination location. Generally, the system 10 correlates geographical information from database 22 with the user's start and end points and any other relevant data to create a route of travel. From the created route, the system 10 guides the user by providing instructions for the user to follow. These instructions may include providing turn-by-turn directions and/or relating landmarks such as names of cross streets, signs, buildings, parks and the like as they are expected to appear along the route. For example, as shown in FIG. 5, the system 10 may relate to the user (through the mobile unit 12) that he/she is approaching street A. Thereafter, the system 10 may instruct the user to turn left onto street A.

In some embodiments, the user may confirm the system's 10 directions by responding to a confirmation request and/or by inputting another form of data such as a recently passed landmark. In other embodiments, the system 10 may automatically track the mobile unit's physical cell location to ensure that the user is appearing in each cell as expected. In yet other embodiments, the system 10 may both monitor the mobile unit's physical cell location and request user input to ensure that the mobile unit 12 is progressing on course. For example, as shown in FIG. 5, the system 10 expects the mobile unit 12 to appear in cell Y then cell X. The system 10 may check for the mobile unit's appearance as expected. Additionally, the system 10 may request a response to its cue that street A is approaching and the directive to turn left onto street A.

If the mobile unit 12 is progressing along the created navigational route the system 10 will continue to provide directives and monitor the mobile unit's 12 presence either by user feedback, system 10 tracking or both. If, however, the mobile unit 12 has turned off course, the system 10 may provide directives to bring the unit 12 back to the desired route. For example, after the system's 10 directive to turn left onto roadway A, the system 10 expects the mobile unit 12 to appear in cell V. However, the system 10 may detect the mobile unit 12 in cell W. Thus, the system 10 may query the user to ensure that the user is indeed off course and provide correctional directives. Alternatively or additionally, the system 10 may detect that the user is off course when the user's response to a directive or query is in the negative. Thus, the system 10 may then guide the user back to the desired navigational route.

Figure 6:
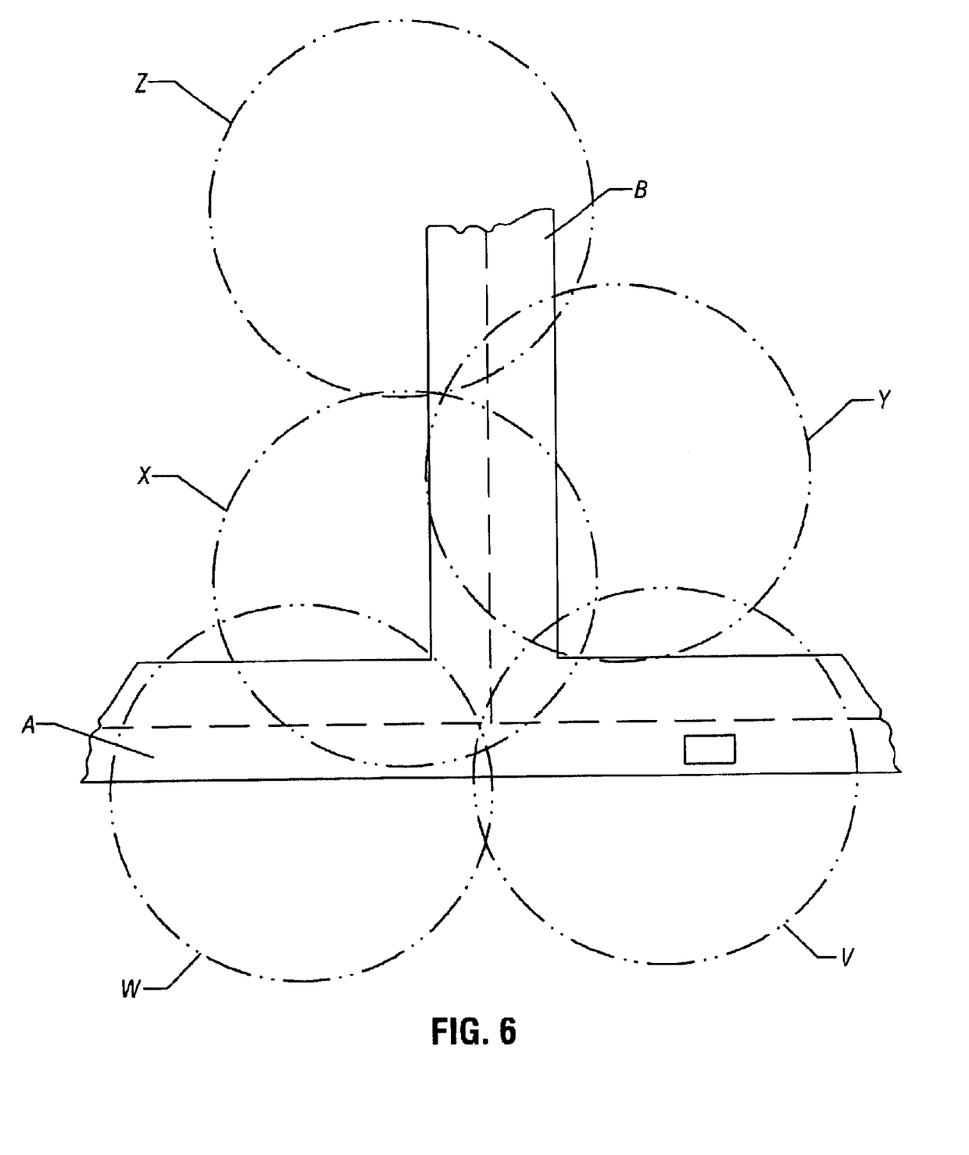
FIG. 6 is a schematic depiction of the navigational system of FIG. 1 where the mobile unit is situated at the destination location in accordance with some embodiments of the present invention.

When the mobile unit 12 has reached the destination location, the system 10 may confirm this fact. In some embodiments, the system 10 may prompt the user to confirm that the destination has been reached. In other embodiments, the system 10 may automatically confirm that the user has reached the destination by the mobile unit's 12 appearance in the expected cell. In yet other embodiments, the system 10 may automatically confirm that the desired destination has been reached and prompt the user to confirm that the destination location has been reached. For example, referring to FIG. 6, after the system 10 has given the user the directive to turn left onto street A, the mobile unit 12 appears as expected in cell V thereby automatically confirming arrival at the destination point. Alternatively or additionally, the system 10 may inquire whether the user has reached the destination.

Figure 7:
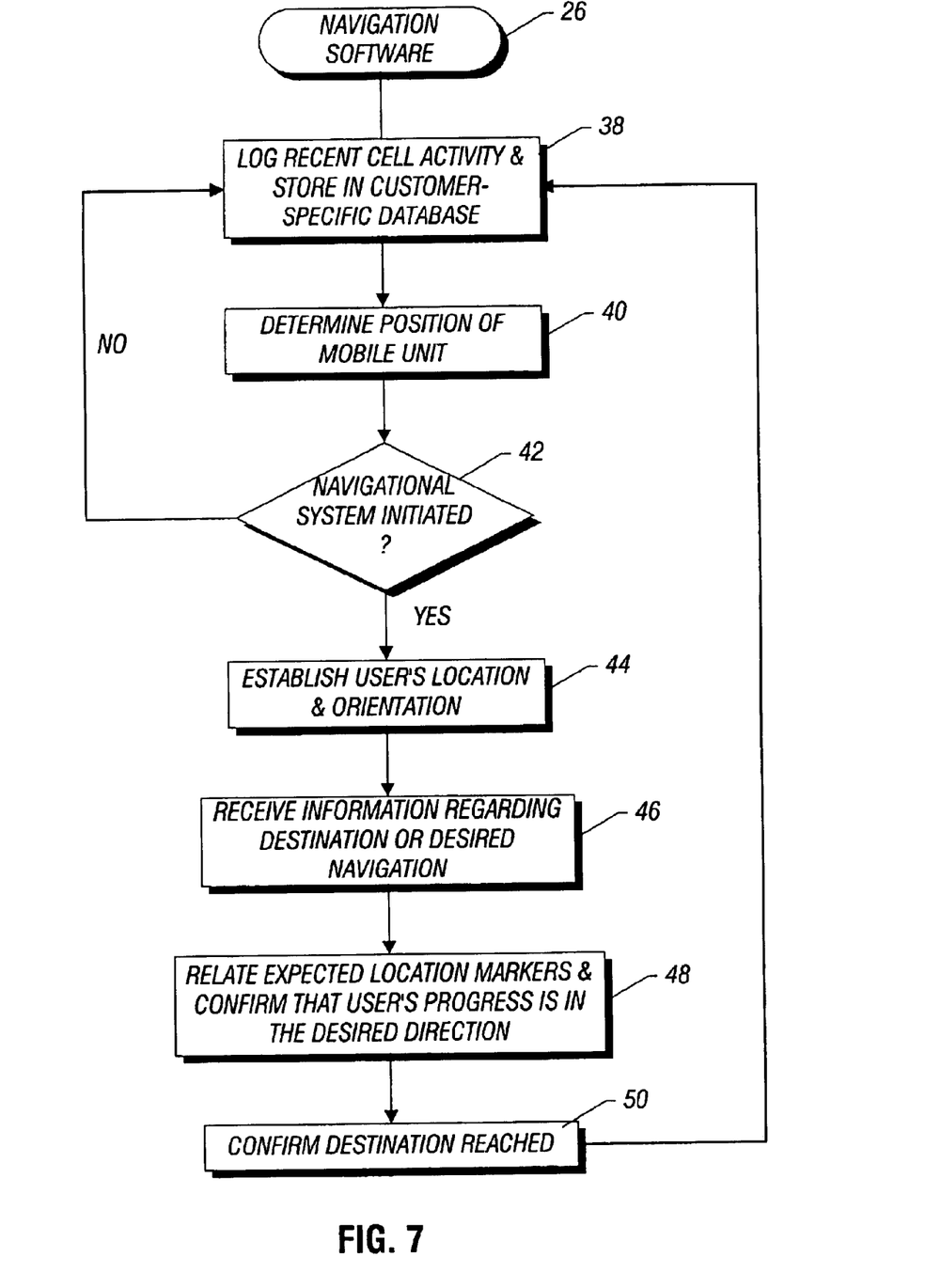
FIG. 7 is a flow chart for software for the navigational system of FIG. 1 in accordance with one embodiment of the present invention.

In one embodiment of the present invention, software 26 may log and store recent physical cell activity for a mobile unit in a customer specific database, as shown in block 38 of FIG. 7. For example, information regarding the mobile unit's physical presence within a cell may be stored for a period of time up to and including the most recent prior four hours. Using this information, the software 26 may determine the location of the mobile unit 12, as shown in block 40. One way in which the mobile unit's 12 location may be determined is by consulting geographical inferential data for the cell that the unit 12 is physically located in to assume a location that is consistent with the geographical data, prior recorded physical cell activity and the implied phone vector. In this way, the software 26 may determine the mobile unit's 12 location at any given time.

As shown in diamond 42, there may be a request for navigational assistance. If navigational assistance 42 is requested, the mobile unit's location and orientation are further established, as indicated in block 44. That is, the unit's location and orientation may be automatically known pursuant to the determination of the mobile unit's location as outlined in block 40. Additionally, the mobile unit's location and orientation may be better established by user input. For example, landmarks or signs indicative of the unit's location and orientation may be proposed to the user until the unit's location is established. Alternately, the user may be directed to enter the names of distinguishing landmarks.

Destination or desired route of travel information may then be received as shown in block 46. The user may input data about a specific destination such as a mall or a desired route of travel such as a scenic route. Alternately, the user may input a telephone number or person's name as destination information. The number or name may then be converted to a physical location such as an address, as will be explained.

Once the mobile unit's origination and destination locations are known, the system 10 may create a route of travel by correlating both types of location information with geographic data from the database 22. The system 10 may then guide the user to the destination or along the route, by relaying expected location markers such as streets, signs, buildings, parks, historic markers and the like as indicated in block 48. Additionally, the system 10 may simultaneously confirm the user's progress along the route by relaying location markers. Thus, providing landmarks may serve the dual purpose of guiding the user and confirming the user's progress. Alternately or additionally, the user's progress may be confirmed by automatically monitoring the mobile unit's 12 appearance in cells as expected.

The system 10 may confirm the user's arrival at the destination, as shown in block 50. The system may confirm that the destination has been reached by the mobile unit's 12 appearance in the expected cell and/or by user query and/or input. Once confirmed, the software 26 continues to log and record physical cell activity as shown in block 38.

Figure 8:
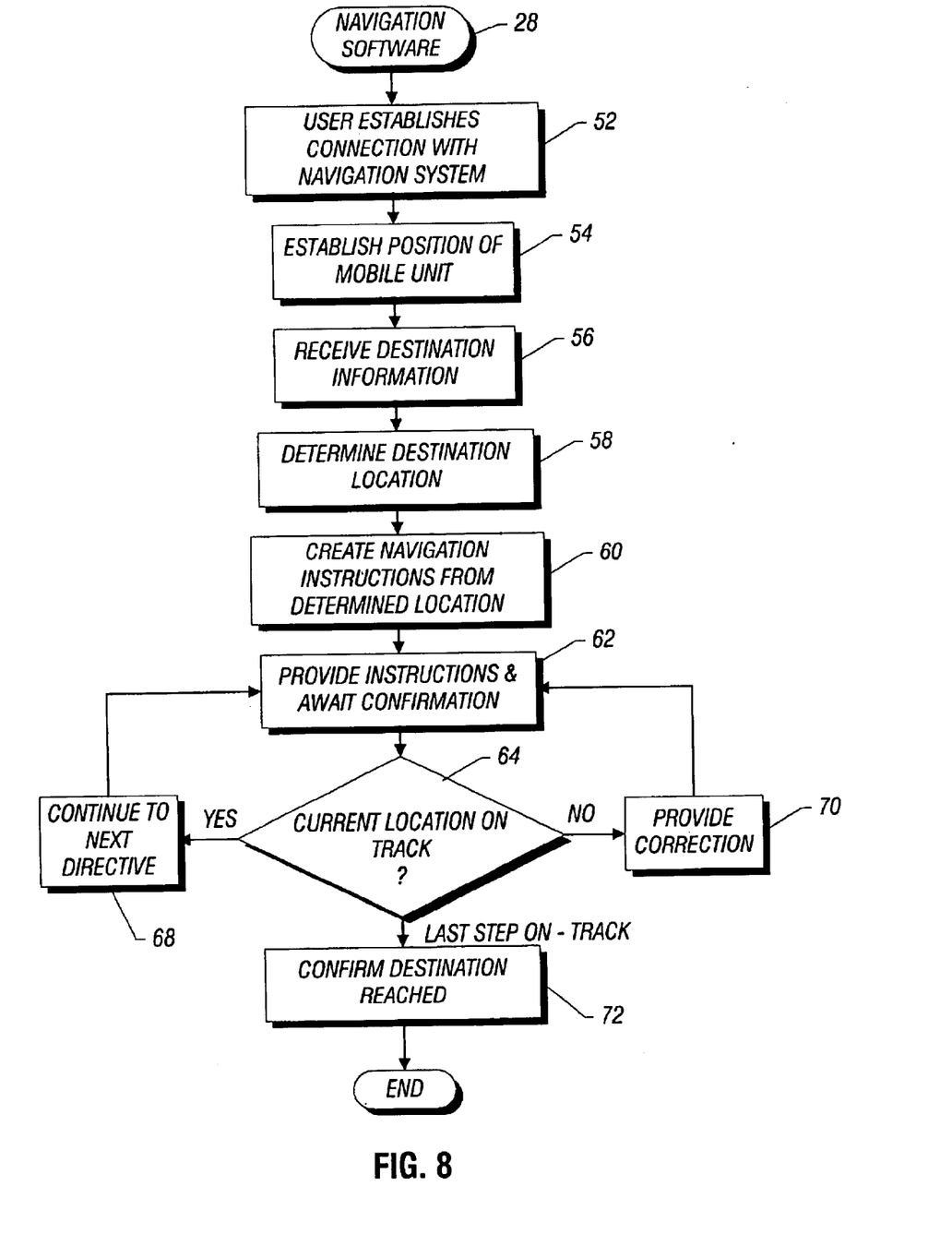
FIG. 8 is a flow chart for software for the navigational system of FIG. 1 in accordance with another embodiment of the present invention.

In another embodiment of the present invention, software 28 may begin when a connection with the navigational system 10 is established, as shown in block 52 of FIG. 8. For example, the user may establish a connection with the system 10 by requesting navigational services via the mobile unit 12. Generally, the mobile unit 12 and the cell site 16 covering the cell that the mobile unit 12 is located in communicate over radio frequencies assigned to that cell. The cell site 16 then transmits this communication to the service provider 14 where the system 10 is located. Return communications from the system 10 to the user generally occur in reverse.

After the user is connected to the system, the position of the mobile unit 12 is established, as shown in block 54. The position of the mobile unit 12 may be established automatically as previously described. That is, automatic determination of the mobile unit's 12 position at any given time, is based on the physical presence of the mobile unit 12 within a cell.

The software 28 may receive destination information, as shown in block 56. Destination information may come in many forms such as an address, a person's name, a phone number, a particular geographical location or the like. As shown in block 58, destination information may be utilized to establish the physical location of the destination. For example, if a telephone number is provided as destination information, the system 10 may use a data source, such as the Internet, a network, an internal database or other available data source to perform a reverse address look up. The system 10 may then use the address corresponding to the phone number as the destination location. If the phone number provided as destination information is for a cell phone, the system 10 may similarly look up the cell phone's data to establish a destination location, which may include the cell in which the cell phone is located.

Similarly, if a name is provided as destination information, the system 10 may look up the address corresponding to that particular name to establish the destination location. If more than one address corresponds to a name, the system 10 may require user input to select which address is the desired destination. In the same manner, if other destination information is provided such as a landmark, the system will look up that landmark's location for navigational purposes.

As previously described, a route of travel may be created based on the user's start and end point and the geographical data between the two. From the created route, navigation instructions may be created to guide the mobile unit 12 to the determined location, as shown in block 60. From the created instructions, the system 10 may provide directives to the user of the mobile unit 12, as shown in block 62. For example, the system 16 may provide turn-by-turn instructions through the mobile unit 12. Alternatively or additionally, the system 10 may alert the user of the mobile unit 12 when expected landmarks should be approaching.

The instructions relayed by the system 10 may be confirmed, which is also shown in block 62. In some embodiments, the user may confirm by any form of data entry such as keypad entry or voice command. In other embodiments, the system 10 may confirm by automatically checking for the mobile unit 12 to physically appear in each cell as expected.

To maintain correct navigation, the system 10 may check that the user of the mobile unit 12 is on track, as shown in diamond 64. If the user is on track, the next directive will be given as shown in block 68. If the user of the mobile unit 12 is not on track, the system 10 will provide correctional directives as shown in block 70. The system 10 will continue giving directives until the last navigational instruction is provided.

Upon the last directive, the system 10 may confirm that the destination has been reached, as shown in block 72. In some embodiments, the user may respond to a prompt confirming that the destination has been reached. In other embodiments, the system 10 may automatically confirm that the destination has been reached by acknowledging that the mobile unit 12 is in the appropriate cell.

According to some embodiments of the present invention, software 92 may reside on a storage on the mobile unit 12. The software 92 may begin by connecting to the navigational system 10 as shown in block 94 of FIG. 9. The connection to the navigational system 10 may be through a radio signal sent to the cell site covering the cell that the mobile unit 12 is presently located in. In turn, that signal is relayed to the service provider 14, which utilizes the navigational system 10. After connecting to the navigational system 10, the software 92 may receive information regarding the present location of the mobile unit 12, as shown in block 96. In some embodiments, the navigational system 10 has automatically determined the mobile unit's 12 location.

Figure 9:
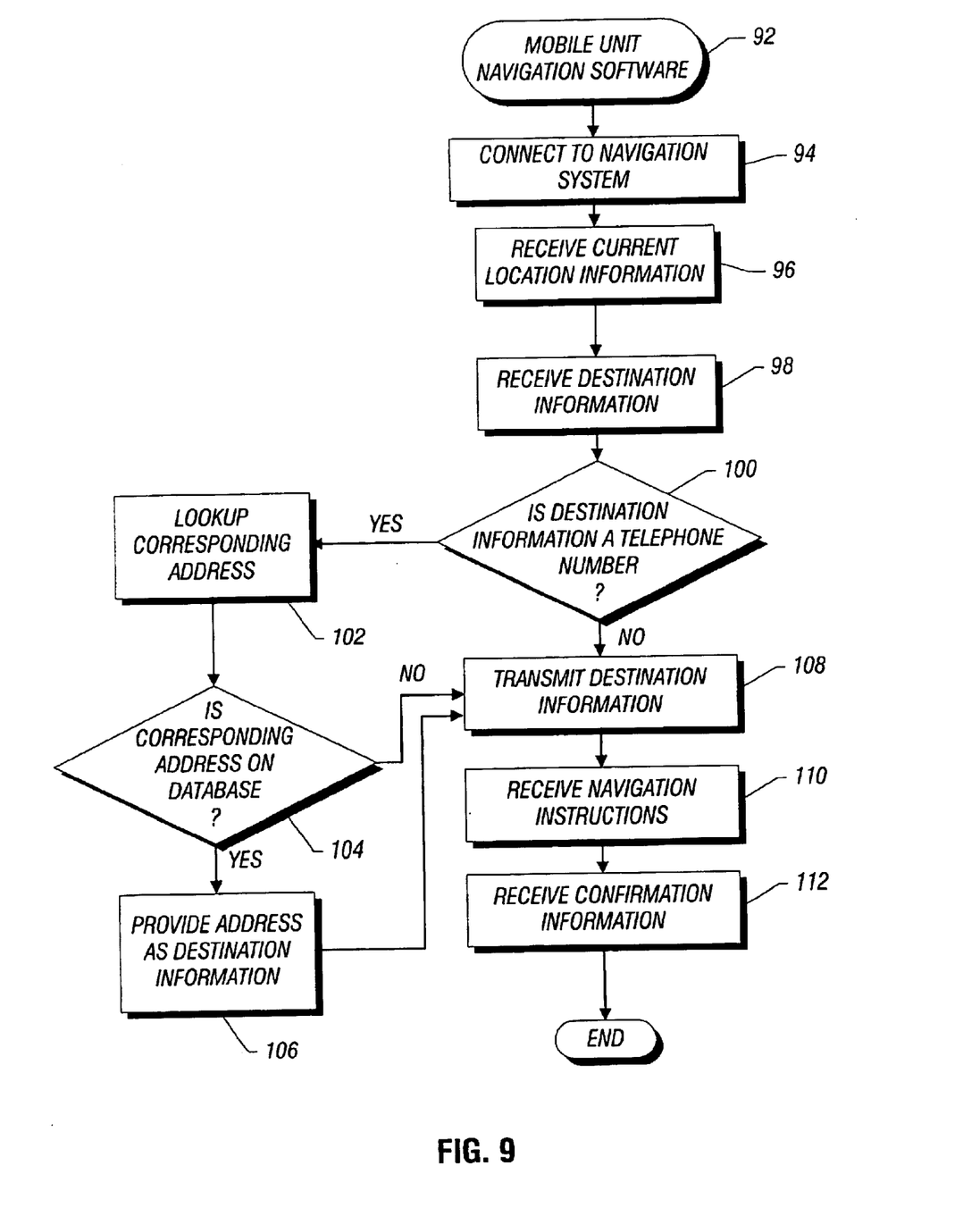
FIG. 9 is a flow chart for software on the mobile unit in accordance with some embodiments of the present invention.

The software 92 may also receive destination information, as shown in block 98. If the destination information is in the form of a telephone number, the software 92 may look up the corresponding address as shown in diamond 100 and block 102, respectively. The software 92 may then determine whether the telephone number corresponding to the inputted address resides in the database on the mobile unit 12, as shown in diamond 104. If the address is on the mobile unit's 12 database, the software 92 provides that address to the navigation system 10 as destination information as shown in block 106. If the inputted telephone number is not present on the mobile unit's 12 database, the telephone number is transmitted to the navigational system 10 as destination information as shown in block 108. Likewise, if the destination information is not a telephone number then the destination information is transmitted to the navigational system 10 also as shown in block 108. Alternate forms of destination information may include a person's name or a geographical landmark. When the navigational system 10 has created navigational instructions, the software 92 may receive those navigation instructions, as shown in block 110. Further when confirmation is requested by the system 10 or supplied by the user, the software 92 may receive that confirmation information as shown in block 112.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

automatically and repetitively inferring a current position of a cellular mobile unit utilizing a radio signal between said mobile unit and a cell site associated with a cellular network, said current position inferred by correlating the location of said mobile unit within said network for a given period of past time with geographic information corresponding to the location;

receiving destination information from the user of said mobile unit to determine a desired destination; and providing guidance to the user from said current position to said desired destination.

2. The method of claim 1 wherein automatically and repetitively inferring said current position includes logging and storing said mobile unit's sequential presence within visited cells over a given period of time within the past four hours.

3. The method of claim 2 further including obtaining geographical data for said visited cells from a geographic database and correlating said geographical data with said visited cells to derive said mobile unit's geographic location and direction of travel within the cell that the mobile unit is presently physically located.

4. The method of claim 1 wherein receiving destination information includes receiving a telephone number to determine a corresponding address as said desired destination.

5. The method of claim 1 further including receiving geographic information from a geographic database to create a route of travel, and relaying a location marker along said route of travel to said user.

6. The method of claim 1 further including confirming said mobile unit's presence at said desired destination.

7. An article comprising a medium storing instructions that enable a processor-based system to:

automatically and repetitively infer a current position of a cellular mobile unit utilizing a radio signal between said mobile unit and a cell cite that is associated with a cellular network, said current position inferred by correlating the location of said mobile unit within said network over a given period of past time with geographic information for the location;

receive destination information from the user of said mobile unit to determine a desired destination; and provide guidance to the user from said current position to said desired destination.

8. The article of claim 7 further storing instructions that enable a processor-based system to log and store said mobile unit's sequential presence within visited cells over a given period of time within the past four hours.

9. The article of claim 8 further storing instructions that enable a processor-based system to obtain geographical data for said visited cells from a geographic database, and correlate said geographical data with said visited cells to derive said mobile unit's geographical location and direction of travel within the cell that said mobile unit is presently physically located.

10. The article of claim 7 further storing instructions that enable a processor-based system to receive a telephone number to determine a corresponding address of said desired destination.

11. The article of claim 7 further storing instructions that enable a processor-based system to receive geographic information from a geographic database to create a route of travel, and relay a location marker along said route of travel to said user.

12. The article of claim 7 further storing instructions that enable a processor-based system to confirm said mobile unit's presence at said desired destination.

13. The article of claim 7 further storing instructions that enable a processor-based system to automatically determine a direction and a speed of travel of said mobile unit.

14. The article of claim 13 further storing instructions that enable a processor-based system to automatically and repetitively infer said current position utilizing said speed and direction of travel information.

15. The article of claim 7 further storing instructions that enable a processor-based system to request user input to establish the location of said mobile unit within a given cell.

16. The article of claim 7 further storing instructions that enable a processor-based system to query a user to establish the location of said mobile unit within a given cell.

17. The method of claim 1 including automatically determining a direction and a speed of travel of said mobile unit.

18. The method of claim 17 wherein automatically and repetitively inferring said current position includes utilizing said speed and direction of travel information.

19. The method of claim 1 including requesting user input to establish said current location of said mobile unit within a given cell.

20. The method of claim 1 including querying a user to establish said current location of said mobile unit within a given cell.

* * * * *